March 16, 1948.  R. MITCHELL  2,437,751

LOCK NUT

Filed Feb. 25, 1943

Inventor
Robert Mitchell
Barthel + Bugbee
Attorneys

Patented Mar. 16, 1948

2,437,751

UNITED STATES PATENT OFFICE 2,437,751

LOCK NUT

Robert Mitchell, Detroit, Mich.

Application February 25, 1943, Serial No. 477,040

5 Claims. (Cl. 151—22)

The present invention relates to improvements in threaded fasteners and more particularly to a self-locking nut.

The primary object of the invention is to provide a threaded fastener, such as a nut, for being threadedly received on a bolt so that the nut will be frictionally retained in position by means of a malleable metal insert associated with the nut having a partially threaded opening in alignment with the threads of the nut.

Another object of the invention is to provide a nut or the like having a recess for receiving a locking member formed of aluminum or similar metal having a relatively low hardness characteristic so that said insert can be locked in position in the recess by being pressed therein and frictionally held by the snug fitting relationship therebetween.

Another object of the invention is to provide a threaded fastener such as a nut or the like as set forth in the above-mentioned object in which the insert and nut blank are threaded by means of a thread tap in such a manner as to cause a partial thread formation in the insert having constant diameter threads in the inner portion of the insert and tapered threads decreasing in diameter from the constant diameter threads to the outer end of the insert, whereby extreme gripping action between the nut and bolt will be facilitated when the nut is threaded home on the bolt.

Reference is hereby made to my copending application, Serial No. 543,551, filed July 5, 1944, which has resulted in Patent No. 2,429,103 of Oct. 14, 1947, which discloses and claims a lock nut having an insert provided with straight threads of slightly smaller diameter than those of the nut body and which for that reason tightly lock the threads of a straight threaded bolt when the latter is threaded through them.

Other objects and advantages of the invention will become apparent during the course of the following description of the accompanying drawing wherein.

Figure 5:
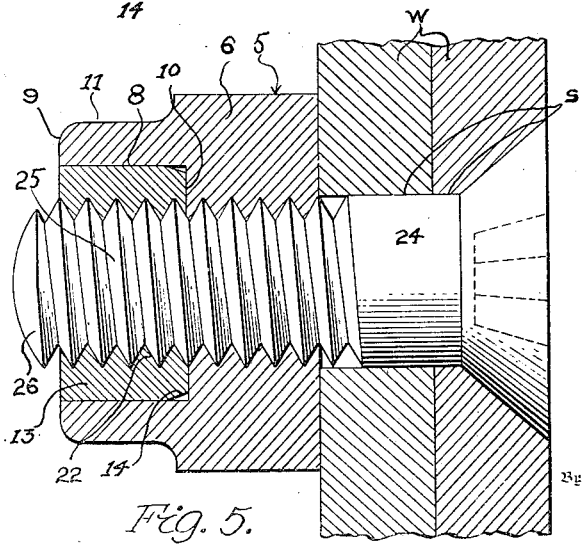
Figure 6:
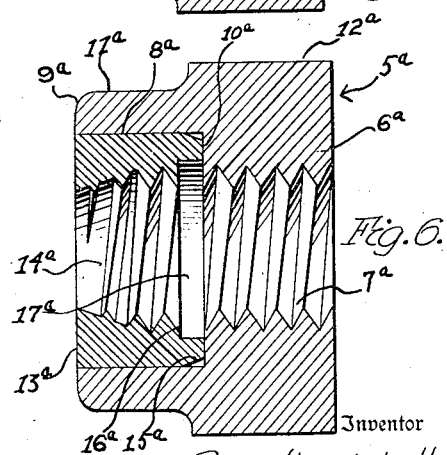

Fig. 5 is a fragmentary sectional view illustrating a nut and insert in cross-sectional detail showing the nut clampingly engaging the work; and Fig. 6 is a vertical cross-sectional view illustrating a modified form of the invention wherein the threaded portions of the aligned bores of the nut body portion and insert are slightly spaced by means of an annular groove formed on the inner end of the insert.

In the drawings, attention is first directed to Figures 1 to 5 inclusive wherein there is illustrated a preferred embodiment of the invention and wherein the reference character 5 will generally be employed to designate a nut blank formed in the usual manner by means already known in the art. The nut blank 5 comprises a body portion 6 having a central opening 7 which is enlarged to provide an enlarged bore or recess 8 extending from the top of the nut 9 inwardly to the intermediate portion thereof where it terminates in a shoulder or the like 10. The enlarged bore 8 is concentrically aligned with the bore 7 and is finely machined to provide a relatively smooth wall surface. The nut blank is reduced as at 11 to provide a circular portion while the body 6 is polygonally shaped to present wrench-engaging faces 12.

Snugly fitted within the bore or recess 8 by means of a press fit is a malleable metal insert 13 of a metal or material softer than the body of the nut 6, having one edge bevelled as at 14 to facilitate the assembly of the insert within the recess 8 when said insert is being pressed into the recess under compression. The insert 13 is provided with an unthreaded bore 15 of substantially the same diameter as the bore 7 and in alignment therewith and, if desired, the upper edge of the insert and nut blank may be peened to insure against displacement of said insert.

Figure 3:
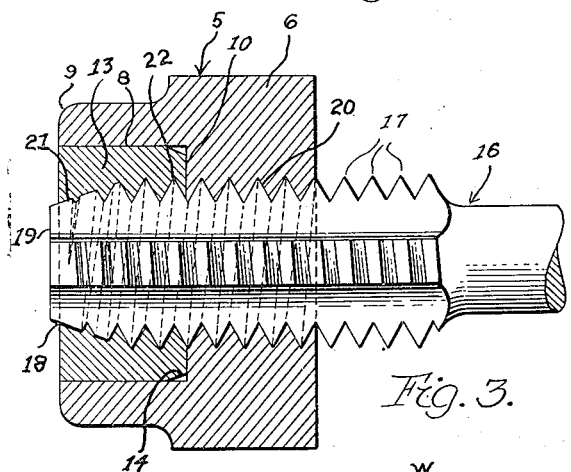
Fig. 3 is a vertical cross-sectional view similar to Fig. 2 showing the manner in which the nut blank is threaded and the insert partially threaded by means of a screw tap.

After the nut blank is thus formed with the recess and the insert positioned therein, the bore 7 is threaded as shown in Fig. 3 by inserting a screw tap 16 having thread-cutting teeth 17 which taper abruptly as at 18 toward the end 19. It will be seen that the thread tap 16 is inserted into the bore 7 of the nut body 6 from the lower end thereof so that the thread cutting teeth 17 will cut or form threads 20 in the threaded body 6 of equal size and dimensions. By referring to Fig. 3 it will be seen that the tapered end 18 of the thread-cutting tap 16 forms a partial thread 21 in the bore 15 which gradually decreases from the innermost threads as at 22 to the outermost threads as at 21. In other words, the thread-cutting tap 16 is not passed completely through the assembled nut body 6 and insert 13 but is only projected therein a sufficient distance to completely thread the bore 7 and the inner portion of the bore 15 of the insert 13 with constant diameter threads as clearly shown in Figure 3, and also to form a tapering thread in the other portion of the bore 15 of the insert 13 diminishing from a point intermediate the ends thereof to the outer end of the insert. The outer end of the insert is substantially flush with the top wall 9 of the nut body 6 to present a continuous and finished appearance.

Figure 4:
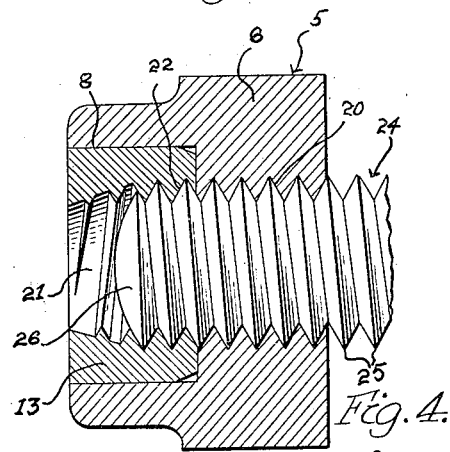
Fig. 4 is a vertical cross sectional view showing the application of the threaded nut and partially threaded nut blank to a bolt or other threaded member.

When starting the nut upon a bolt generally indicated by the reference character 24 the threads 25 of the bolt are received in the threads 20 of the nut body 6 as shown in Fig. 4 and upon continued threading of the bolt 24 into the nut body or vice versa, the end of the bolt 24 will be started in the constant diameter threads 22 of the insert 13 and will hold the insert 13 securely in position before it meets with the resistance offered by the tapered threads 21 thereof thereby preventing the insert from being pushed outwardly or displaced from the recess 8. Upon continued turning movement of the nut body 6 relative to the bolt 24 the outermost threads 25 of the bolt will compress the tapered partially threaded portion 21 of the insert so that said tapered portion will frictionally grip the threads 25 of the bolt 24. As shown in Fig. 5, when the bolt 24 is passed completely through the insert 13, it acts like a tap and cuts constant diameter threads in the tapered partially threaded portion 21, the frictional resistance thus set up by the almost total lack of clearance between the threads of the bolt and outer end of the bore 13 causing the bolt 24 to frictionally grip the insert 13 in a tight embrace and retain the nut 5 in position for clamping the pieces of work W together. The bolt 24 is passed through aligned openings S in the work so that the free end thereof will project beyond the work thereby the nut 5 will clampingly engage the work and will be frictionally locked upon the bolt against removal.

It is to be understood, that the insert 13 is formed of a relatively soft and deformable metal so that when the nut 6 is threaded on the bolt 24 the tapered partially threaded portion 21 will deform to such an extent as to cause a tight gripping action between the coupled nut and bolt.

In the modified form of the invention shown in Fig. 6 the nut blank 5a is substantially identical to the form shown in Figures 1 to 5, inclusive, and comprises a body portion 6a having a central bore 7a extending from the base of the nut to the intermediate portion thereof. The bore 7a is enlarged as at 8a to provide an annular recess which extends from the top of the nut 9a to the shoulder 10a inwardly of the nut body. The nut body 6a is provided with a rounded head portion 11a and is formed with a polygonal base portion 12a to provide a series of wrench receiving faces similar to the faces 12 shown in Fig. 1.

Snugly fitted within the enlarged bore 8a is a malleable metal insert 13a formed of a relatively soft metal and said insert 13a is provided with a bore 14a in registry with the central bore 7a in the nut body. The inner end of the insert 13a is bevelled as at 15a to facilitate the starting of the insert within the bore 8a when the same is being pressed home therein upon the shoulder 10a. The inner end of the insert 13a is chamfered as at 16a internally to provide an annular space 17a between the aligned bores 7a and 14a of the nut body 6a and 13a respectively.

Figure 1:
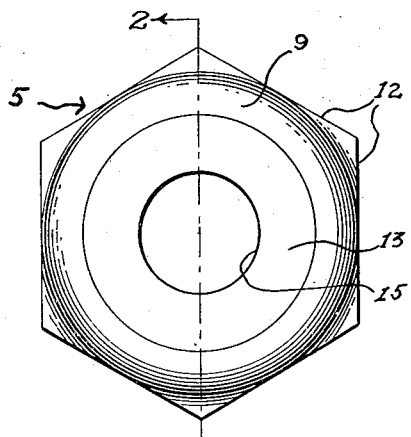
Fig. 1 is a top plan view of a blank fastener illustrating a preferred embodiment of the invention and showing the manner in which the insert is received in a recess in a nut blank or other fastener blank member.
Figure 2:
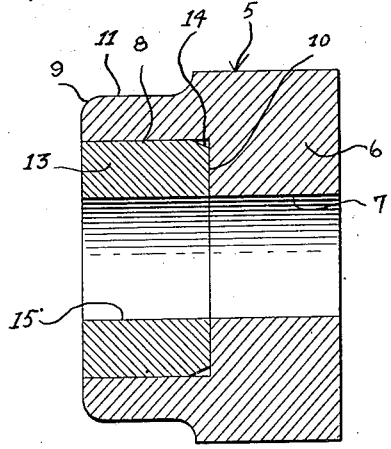
Fig. 2 is a vertical cross-sectional view taken on line 2—2 of Fig. 1 looking in the direction of the arrows and illustrating the manner in which the nut is adapted to frictionally receive the malleable metal insert.

The bore 7a is threaded by means of a threading tap 16 as shrown in Figure 3 in identically the same manner as the nut blank shown in Figure 2, and that the bore 14a of the insert 13a be similarly threaded to provide gradually decreasing threads conforming to the taper 18 of the threading tap 16. After the threaded member shown in Fig. 6 has been threaded as above described the nut body 5a may be placed upon a machine screw or bolt so that the threads thereof will engage the partially formed threads in the insert 13a and frictionally engage the same to lock the nut and bolt in coupled relation. When the nut 5a is drawn down tightly the partially threaded portion of the insert 13a will be compressed toward the shoulder 10a slightly by reason of the annular chamber 17a.

It is pointed out that the threads 20 of the nut body 6 and the threads 22 of the insert are continuous by reason of the manner in which they are formed so that said threads will align and facilitate the following of the threads 22 upon the threads 25 of the bolt 24 during their initial movement upon the threads, and that when the bolt threads 25 have entered the threads 22 of the insert, the insert will be drawn tightly toward the nut body and will thereby be clamped or retained in position within the recess 8 against rotational and lateral movement.

It is to be understood that the forms of the invention herewith shown and described are to be taken as preferred embodiments thereof and that various changes in the shape, size and arrangement of parts may be resorted to without departing from the spirit of the invention or the scope of the subjoined claims.

What I claim is:

1. A threaded fastener comprising a body portion having a threaded opening terminating in an enlarged bore, an insert mounted in said bore having a thread of gradually decreasing dimensions and an annular chamfered portion formed in the inner wall of said insert to provide a space between the threads of the body portion and said insert.

2. A threaded fastener comprising a body portion having a threaded opening terminating at one end in an enlarged recess, an insert formed of malleable metal snugly fitted in said recess and having a central opening in alignment with said threaded opening, an annular recess formed in one end of the insert providing a space between said threaded opening and said bore, and a gradually tapered screw thread formed in the opening of said insert diminishing in size from the annular recess to the outermost end of said insert.

3. A threaded fastener comprising a body portion having a central threaded opening terminating at one end in an enlarged bore, a malleable metal insert snugly fitted in said bore, an interior annular recess formed in said insert providing a chamber between the threaded opening of the body portion and an aligned bore of the insert and a gradually diminishing thread formed in the bore of said insert decreasing in dimensions from the annular chamber to the top of the nut.

4. A threaded fastener comprising a body having a threaded opening with substantially constant diameter threads terminating at one end in an enlarged cylindrical recess, and an annular insert formed of softer metal than said body portion snugly fitted in said recess and having a central opening in alignment with said threaded body opening, said insert opening containing an inner threaded portion having constant diameter threads aligned with and of substantially the same diameter as said body opening threads and also having a gradually-tapered outer threaded portion aligned with and diminishing in diameter from said constant diameter threaded insert portion to the outermost end of said insert, whereby a threaded member threaded through said body opening first engages the large diameter threads of said insert to firmly anchor said insert in said recess before engaging the gradually-tapered threaded portion thereof with its increased resistance.

5. A threaded fastener comprising a body having a threaded opening with substantially constant diameter threads terminating at one end in an enlarged cylindrical recess, and an annular insert formed of softer metal than said body portion snugly fitted in said recess and having a central opening containing an inner threaded portion having constant diameter threads aligned with and of substantially the same diameter as said body opening threads and also having a gradually-tapered outer threaded portion aligned with and diminishing in diameter from said constant diameter threaded insert portion to the outermost end of said insert, whereby a threaded member threaded through said body opening first engages the large diameter threads of said insert to firmly anchor said insert in said recess before engaging the gradually-tapered threaded portion thereof with its increased resistance, said insert having the periphery of its inner end bevelled whereby to facilitate its insertion in said recess.

ROBERT MITCHELL.

REFERENCES CITED

The following references are of record in the file of this patent:

UNITED STATES PATENTS

| Number | Name | Date |
| --- | --- | --- |
| 597,000 | Higbee | Jan. 11, 1898 |
| 2,153,681 | Swanstrom | Apr. 11, 1939 |
| 2,340,589 | Harpoothian | Feb. 1, 1944 |

FOREIGN PATENTS

| Number | Country | Date |
| --- | --- | --- |
| 228,002 | Great Britain | Jan. 29, 1925 |
| 473,280 | Germany | Mar. 12, 1929 |